United States Patent
Kasiviswanathan

(10) Patent No.: US 6,215,857 B1
(45) Date of Patent: Apr. 10, 2001

(54) SYSTEM, METHOD AND APPARATUS FOR DIRECT VOICE MAIL ACCESS AND BLOCKING

(75) Inventor: Rangarajan Kasiviswanathan, Garland, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/975,091

(22) Filed: Nov. 20, 1997

(51) Int. Cl.$^7$ .......................... H04M 1/04; H04M 11/00; H04M 3/42

(52) U.S. Cl. ...................... 379/67.1; 379/69; 379/88.08; 379/88.22; 379/212

(58) Field of Search ........................ 379/67.1, 69, 70, 379/79, 82, 88.01, 88.07, 88.09, 88.19, 201, 210, 211–212, 142, 229, 233, 88.2, 88.22, 88.08; 455/312, 445, 33.1, 33.2; 704/483, 445, 466

(56) References Cited

U.S. PATENT DOCUMENTS

| | | | |
|---|---|---|---|
| 4,612,416 | | 9/1986 | Emerson et al. ..................... 179/6.1 |
| 4,896,353 | | 1/1990 | Dehgani et al. ........................ 380/6 |
| 4,959,842 | | 9/1990 | Forney, Jr. ............................ 375/39 |
| 4,972,461 | * | 11/1990 | Brown et al. ....................... 379/67.1 |
| 5,327,486 | * | 7/1994 | Wolff et al. .......................... 379/96 |
| 5,442,627 | | 8/1995 | Viterbi et al. ........................ 370/22 |
| 5,467,390 | * | 11/1995 | Brankley et al. .................... 379/229 |
| 5,497,414 | * | 3/1996 | Bartholomew ...................... 379/142 |
| 5,559,860 | * | 9/1996 | Mizikovsky .......................... 379/58 |
| 5,572,583 | * | 11/1996 | Wheeler, Jr. et al. ............... 379/207 |
| 5,598,464 | * | 1/1997 | Hess et al. .......................... 379/213 |
| 5,661,782 | * | 8/1997 | Bartholomew et al. ........... 379/67.1 |
| 5,712,903 | * | 1/1998 | Bartholomew et al. .............. 379/89 |
| 5,742,905 | * | 4/1998 | Pepe et al. ........................... 455/461 |
| 5,752,191 | * | 5/1998 | Fuller et al. ......................... 455/445 |
| 5,812,639 | * | 9/1998 | Bartholomew et al. .............. 379/89 |
| 5,878,397 | * | 3/1999 | Stille et al. .......................... 704/366 |

FOREIGN PATENT DOCUMENTS 0 613 278 A1   2/1994   (EP) .

OTHER PUBLICATIONS

PCT International Search Report, Oct. 22, 1998, PCT/US 98/16780.

Ran, et al., "Constrained Designs for Maximum Likelihood Soft Decoding of RM (2,m) and the Extended Golay Codes", IEEE Transactions on Communications, Feb./Apr. 1995, pp. 812–820.

Hammons, et al., "The $Z_4$–Linearity of Kerdock, Preparata, Goethals, and Related Codes", IEEE Transactions on Information Theory, Mar. 1994, pp. 301–319.

Ran, et al., "Concise Coset Representation for Maximum Likelihood Soft Decision Decoding of RM (2,m) Codes", Communication, Control, and Signal Processing, 1990, pp. 287–293.

(List continued on next page.)

Primary Examiner—Fan Tsang
Assistant Examiner—Allan Hoosain
(74) Attorney, Agent, or Firm—Jenkens & Gilchrist, P.C.

(57) ABSTRACT

A telecommunications system and method is disclosed for enabling a calling subscriber to invoke the forwarding of a call to a voice mail system for the called subscriber on a call-by-call basis in order to leave a message for the called subscriber without disturbing (ringing) the called subscriber. The associated disadvantage with this "Direct Voice Mail Access" (DVMA) feature is that the called party will lose control over his/her call forwarding to voice mail feature for that particular call. Therefore, in order to overcome this disadvantage, another feature, "Direct Voice Mail Access Blocking" (DVMAB) can be implemented to allow the called subscriber to inhibit direct access to their voice mail by the calling subscriber.

36 Claims, 5 Drawing Sheets

OTHER PUBLICATIONS

Moorthy, et al., "Good Trellises for IC Implementation of Viterbi Decoders for Linear Block Codes", IEEE Transactions on Communications, Jan., 1997, pp. 52–63.

Conway, et al., "Soft Decoding Techniques for Codes and Lattices, Including the Golay Code and the Leech Lattice", IEEE Transaction on Information Theory, Jan. 1986, pp. 41–50.

Wesley Peterson: "Error Correcting Codes", Chapter 5, pp. 64–86.

C. R. Newson; "Merlin Voice Mail VM600"; British Telecommunications Engineering, vol. 4, Apr. 1985; pp. 32–35.

PCT International Search Report dated Apr. 20, 1999.

* cited by examiner

SYSTEM, METHOD AND APPARATUS FOR DIRECT VOICE MAIL ACCESS AND BLOCKING

BACKGROUND OF THE PRESENT INVENTION

1. Field of the Invention

The present invention relates generally to telecommunications systems and methods for routing calls to voice mail systems, and specifically to enabling a calling subscriber to directly connect to a voice mail system of the called subscriber without ringing the called subscriber and to allowing a called subscriber to prevent a calling subscriber from directly accessing the called subscribers voice mail system.

BACKGROUND AND OBJECTS OF THE PRESENT INVENTION

Since the beginning of the telephone in the 1870's, signaling has been an integral part of telephone communications. Such signaling typically includes the call setup, such as ringing the called party, and teardown procedures. In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. In the IN, everything is controlled or configured by workstations with user-friendly software. Telephone service representatives can, therefore, create new services and tailor a subscriber's service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. Currently, the IN relies on the Signaling System #7 (SS7) network, which provides the basic infrastructure needed for the various signaling points in the IN. SS7, in turn, relies on Common Channel Signaling, which uses a digital facility, but places the signaling information in a time slot or channel separate from the voice and data to which it is related. This allows signaling information to be consolidated and sent through its own network apart from the voice network.

The various signaling points in the IN both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

With reference now to FIG. 1 of the drawings, the many Service Switching Points (SSPs) 100 serve as the local exchanges in a telephone network 90, a portion of which is shown in FIG. 1. The SSPs 100 preferably provide an Integrated Services Digital Network (ISDN) interface for the Signal Transfer Points (STPs) 110, as is understood in the art. The signaling information is handed off to the SS7 network and transferred to an end office (another SSP) using SS7 ISDN User Part (ISUP) protocol, which is responsible for all call setup and tear down.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information, as is understood in the art.

Local service providers (SSPs) are currently providing centralized voice mail systems to subscribers as a substitute for individual answering machines. Increasingly, subscribers are opting for these centralized voice mail systems due to the flexibilities that they provide. In addition, most business group subscribers have voice mail systems implemented within their offices. Voice mail is provided to subscribers using one of the variants of a call forwarding feature, which is understood in the art. Typically, the called subscriber is assigned a "Call Forwarding Don't Answer" (CFD) feature and "Call Forwarding Busy" (CFB) feature, which will allow the call to be forwarded to the called subscriber's voice mail. Thus, the call will be forwarded to the called subscriber's voice mail if either the called subscriber does not answer the call or the called subscriber's line is busy.

In some cases, a calling subscriber may wish to leave a voice mail message for the called subscriber without disturbing the called subscriber. Existing technology allows a voice mail to be accessed only using call forwarding features without any control by the calling subscriber as to when the call forwarding feature is invoked. However, if the called subscriber is on the same voice mail system as the calling subscriber, the voice mail system may provide the ability to leave a message without disturbing the called subscriber.

Unfortunately, if the calling and called subscriber are not on the same voice mail system, it is not possible, at present, to leave a message without ringing the called subscriber, unless the called subscriber has instructed the local service provider to forward all calls directly to the voice mail system without ringing. Once again, this does not allow a calling subscriber to control whether or not the voice mail system should be directly accessed for that call.

In addition, if the voice mail system itself has a separate number associated with it, which can be accessed by a calling subscriber, the calling subscriber typically cannot enter the called subscriber's voice mail box without entering the voice mail box number, listening to the menu to pick up the correct choice, and then leaving a message. This process is cumbersome and inconvenient for a calling subscriber and requires the calling subscriber to remember the called subscriber's voice mail box number. In addition, this method of access does not provide any control on the part of the called subscriber to prevent direct voice mail access.

It is therefore an object of the invention to provide direct access by the calling subscriber to the voice mail of the called subscriber without ringing (disturbing) the called subscriber.

It is a further object of the invention to allow the called subscriber to control when a calling subscriber can reach his/her voice mail directly.

SUMMARY OF THE INVENTION

The present invention is directed to telecommunications systems and methods for enabling a calling subscriber to invoke the forwarding of a call to a called subscriber to a voice mail system for the called subscriber on a call-by-call basis in order to leave a message for the called subscriber without disturbing the called subscriber. This "Direct Voice Mail Access" (DVMA) feature is particularly useful in business environments where, for example, the calling party either knows the called party is busy or does not have time for a conversation. This feature can also be useful in residential environments where, for example, the calling party needs to leave a message for the called party late at night.

The associated disadvantage with this DVMA feature is that the called party will lose control over his/her call forwarding to voice mail feature for that particular call. Therefore, in order to overcome this disadvantage, another feature, "Direct Voice Mail Access Blocking" (DVMAB) can be implemented to allow the called subscriber to inhibit direct access to their voice mail by the calling subscriber.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

"Direct Voice Mail Access" (DVMA) is a feature that provides capability to a calling subscriber to access a voice mail system of a called subscriber without disturbing (ringing) the called subscriber. The DVMA feature can be activated or deactivated by means of subscriber procedures (dialing a service code, such as *yy). When a subscriber subscribes to DVMA, the local service provider will administer the feature and activate it. Subsequently, if the subscriber who has subscribed to DVMA, wants to deactivate the feature (block the feature), he/she can dial a service code, e.g., *yy, to deactivate the DVMA feature. To activate the feature, the subscriber can dial another service code, e.g., *zz, and the feature will be activated. The actual implementation of DVMA varies depending upon whether the calling and called subscribers are within the same switch.

Figure 1:
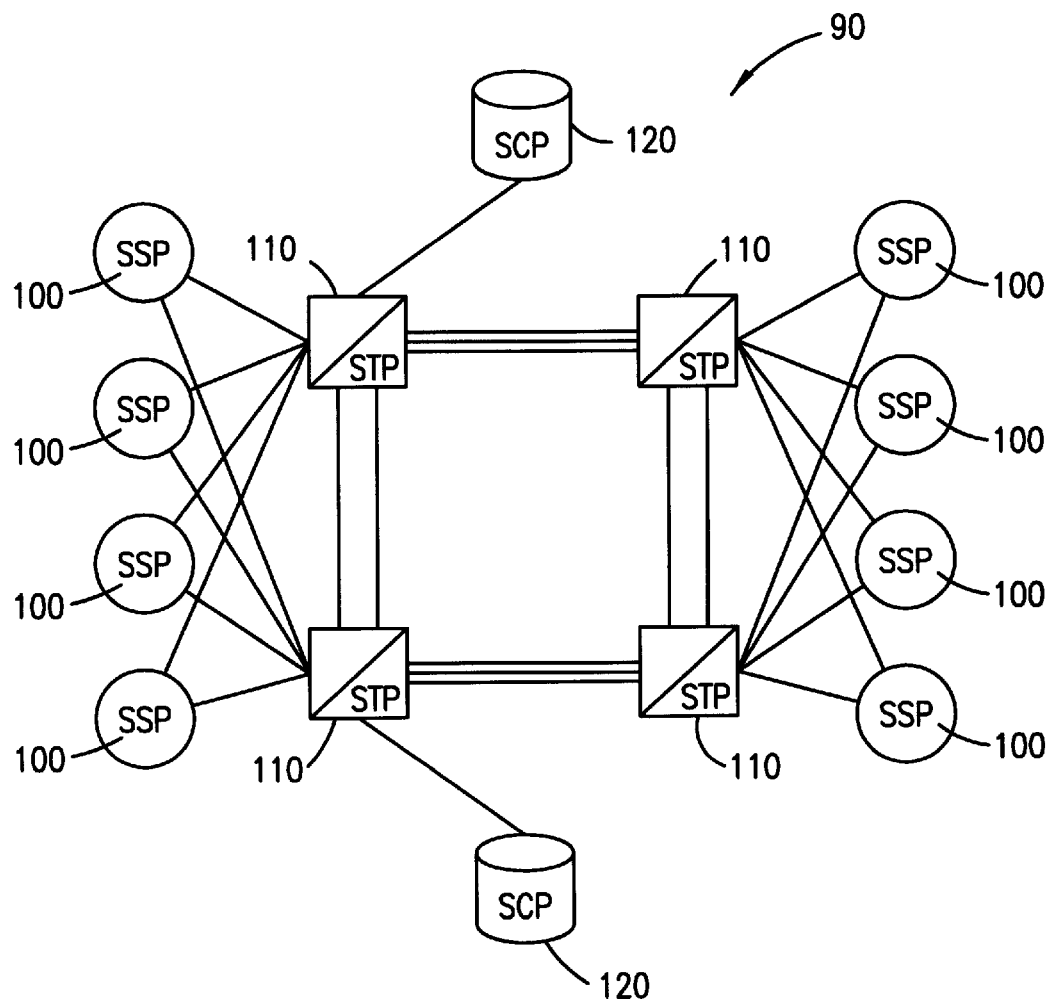
FIG. 1 is a block diagram illustrating some of the basic components used in an Intelligent Network or an Advanced Intelligent Network for signal switching.
Figure 2:
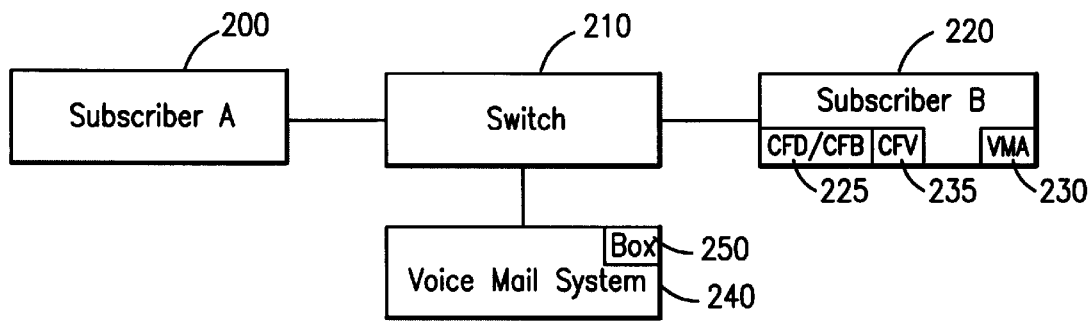
FIG. 2 is a block diagram depicting a sample embodiment of an intra-switch Direct Voice Mail Access system of the present invention.

With reference now to FIG. 2 of the drawings, in the case where both the calling subscriber, hereinafter referred to as Subscriber A 200, and the called subscriber, hereinafter referred to as Subscriber B 220, are within the same Switch 210 (local service provider, Service Switching Point (SSP), or end office), intra-switch DVMA can be implemented. If Subscriber B 200 has subscribed to the voice mail service 240 provided by Switch 210, Switch 210 then assigns a new subscriber category, Voice Mail Access (VMA) 230, to Subscriber B 220 to indicate that calls not received by Subscriber B 220 will be forwarded to Subscriber B's voice mail box 250 within the voice mail system 240.

Figure 3:
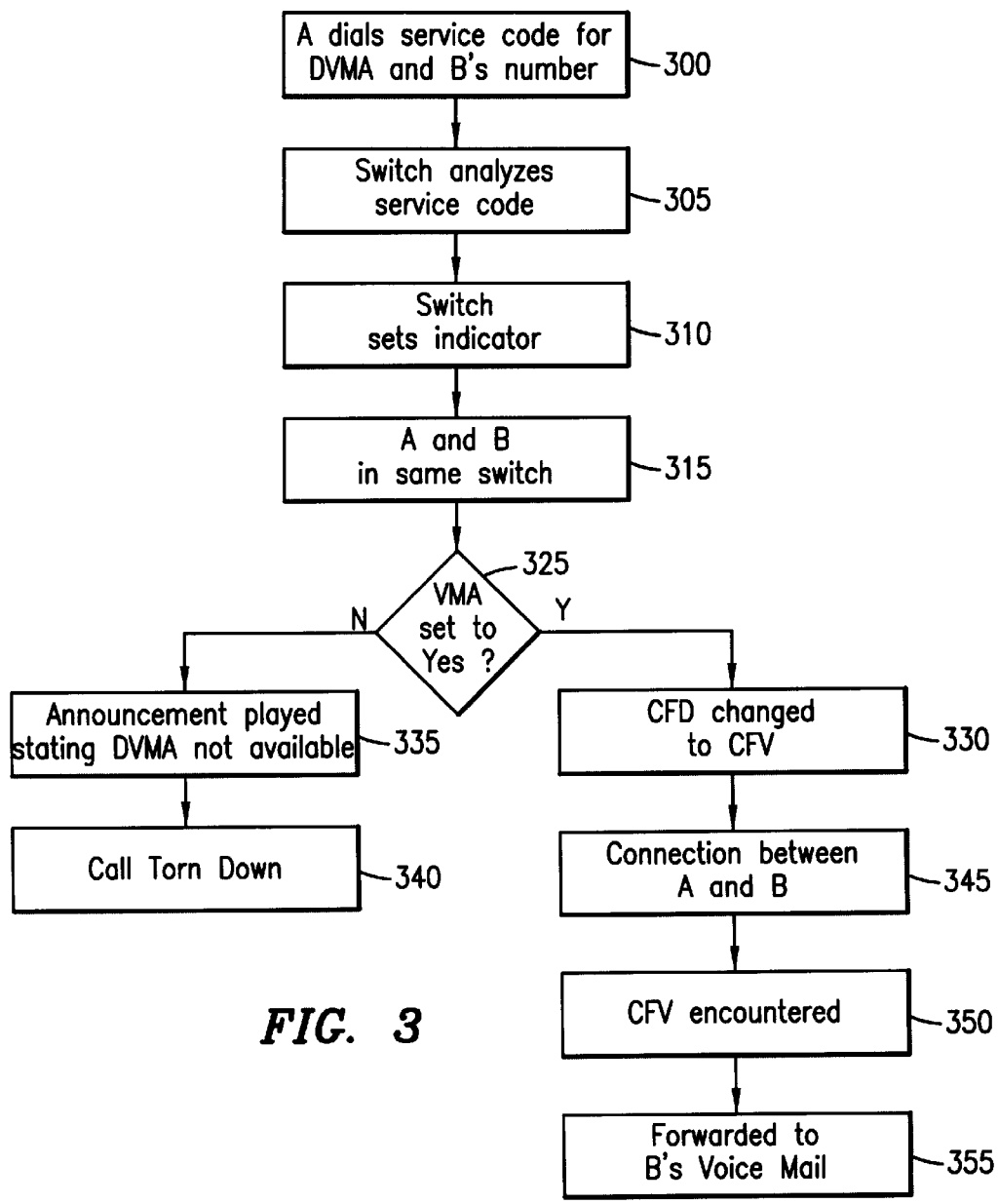
FIG. 3 illustrates steps in a sample intra-switch Direct Voice Mail Access process of the present invention.

As shown in FIG. 3 of the drawings, which will be described in connection with FIG. 2 of the drawings, steps in a sample intra-switch utilization of the DVMA feature of the present invention are illustrated in which Subscriber A 200 first dials the service code for DVMA, e.g., *xx, followed by Subscriber B's 220 number (step 300). Thereafter, Switch 210 analyzes the DVMA service code entered by Subscriber A 200 (step 305), and sets an indicator associated with the call to "DVMA requested" (step 310).

Switch 210 then determines that Subscriber B 220 resides in the same switch 210 as Subscriber A 200 (step 315) and ascertains whether Subscriber B 220 has a voice mail feature (step 325), e.a., by checking the VMA category 230 associated with Subscriber B 220. If Subscriber B 220 has the voice mail feature (step 325), e.g., the VMA category 230 is set to "yes", Switch 210 changes the "Call Forwarding Don't Answer" (CFD) feature 225, which routes the call to the called subscribers voice mail system 240 when the called subscriber 220 does not answer the call, to a "Call Forwarding Variable" (CFV) feature 235 (step 330), which routes the call directly to the called subscribers voice mail box 250 for this particular call. This CFV feature 235 is typically used by a called subscriber (Subscriber B 220) to instruct Switch 210 to forward all calls directly to the voice mail system 240 without ringing. However, with the present invention, Subscriber A 200 is allowed to control when to directly access Subscriber B's voice mail box 250.

However, if the voice mail feature 230 is either not assigned to Subscriber B 220 or is inactive (step 325), an announcement will be played to Subscriber A 200 stating that DVMA is not available (step 335), and the call will be torn down without being set up (step 340).

After changing the call forwarding category for the call (step 330), a call connection is established between Subscriber A 200 and Subscriber B 220 (step 345). At seizure, the call will encounter CFV 235 (step 350) and the call will be forwarded to Subscriber B's voice mail box 250 within the voice mail system 240 (step 355). Advantageously, Subscriber B 220 will not be disturbed (except for a ping ring, e.g., one-fourth of a ring) and the voice mail system 240 can then be directly accessed by Subscriber A 200.

Figure 4:
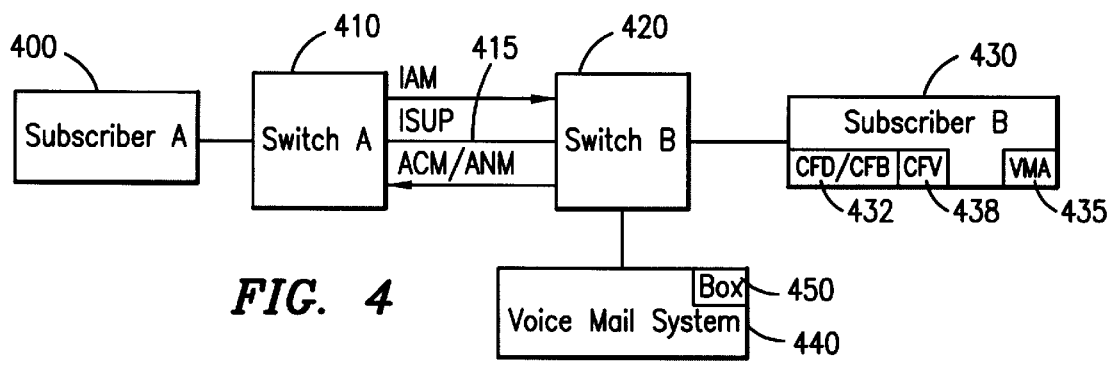
FIG. 4 is a block diagram depicting a sample embodiment of an inter-switch Direct Voice Mail Access system of the present invention.

For inter-switch DVMA, as shown in FIG. 4 of the drawings, in which Subscriber A 400 and Subscriber B 430 are served by two separate switches (Switch A 410 and Switch B 420 respectively), Switch A 410 and Switch B 420 must be connected by SS7 signaling in order to route the appropriate messages, which carry instructions regarding the DVMA feature, between the switches.

As indicated in FIG. 4 of the drawings, Subscriber B 430 has been assigned the Call Forwarding Don't Answer (CFD) and Call Forwarding Busy (CFB) 432 features, which enable calls that either are not answered by Subscriber B 430 or which encounter a "busy" signal to be routed to Subscriber B's voice mail box 450 within the voice mail system 440. Furthermore, Subscriber B 430 has also been assigned the new category Voice Mail Access (VMA) 435 to indicate that Subscriber B 430 is connected to a voice mail service 440. The two switches (Switch A 410 and Switch B 420) are connected by Integrated Service Digital Network (ISDN) User Part (ISUP) trunks 415 and utilize ISDN User Part (ISUP) protocols to send messages between the switches.

Figure 5:
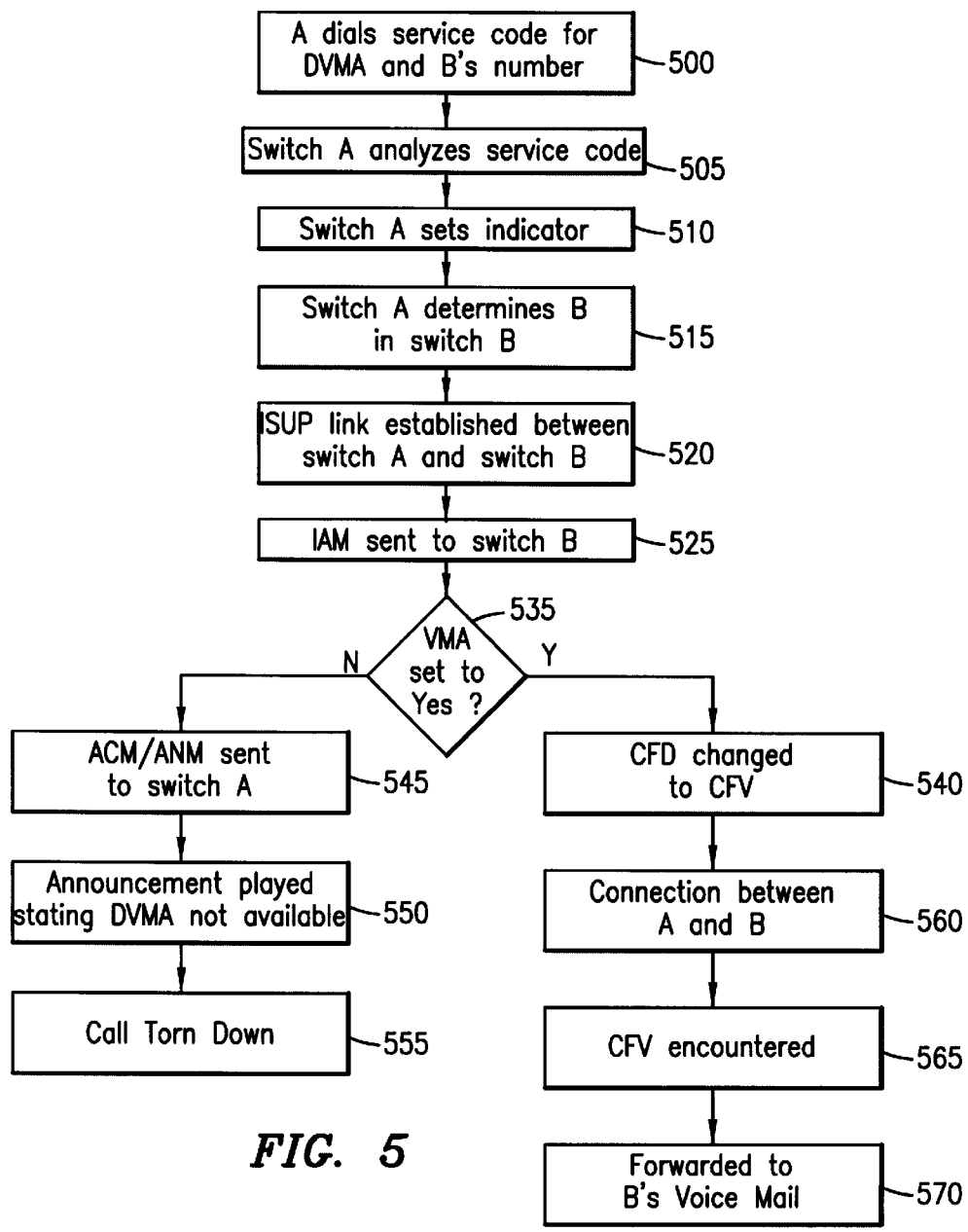
FIG. 5 illustrates steps in a sample inter-switch Direct Voice Mail Access process of the present invention.

With reference now to FIG. 5 of the drawings, which will be described in connection with FIG. 4 of the drawings, steps in a sample implementation of the inter-switch DVMA feature of the present invention are illustrated in which Subscriber A 400 first dials the service code for DVMA, e.g., *xx, followed by Subscriber B's 430 number (step 500). Thereafter, Switch A 410 analyzes the DVMA service code entered by Subscriber A 400 (step 505), and sets an indicator associated with the call to "DVMA requested" (step 510).

Switch A 410 then performs B-number analysis, as is understood in the art, on Subscriber B's 430 number and determines that Subscriber B 430 does not reside in Switch A 410 (step 515). Thereafter, Switch A 410 checks whether there is an ISUP link 415 between Switch A 410 and Switch B 420 (step 520). If such a link 415 is available (step 520), Switch A sends a "Service Activation Parameter" with a "Feature Code" coded as a "DVMA request" in the Initial Address Message (IAM), along with other information, to Switch B 420 (step 525). Upon receiving the IAM, Switch B 420 processes the call normally, as is well known in the art, by ascertaining whether Subscriber B 430 has purchased a voice mail feature (step 535), e.g., by checking the VMA category 435 associated with Subscriber B 430.

If Subscriber B 430 has the voice mail feature (step 535), e.g., the VMA category 435 is set to "yes", Switch B 420 changes the "Call Forwarding Don't Answer" (CFD) feature 432, which routes the call to the called subscribers voice mail system 440 when the called subscriber 430 does not answer the call, to a "Call Forwarding Variable" (CFV) feature 438 (step 540), which routes the call directly to the called subscribers voice mail box 450 for this particular call.

However, if the voice mail feature 435 is either not assigned to Subscriber B 430 or is inactive (step 535), Switch B 420 will respond to Switch A 410 with a "Service Activation" parameter in an Address Complete Message (ACM) or Answer Message (ANM) with a "Feature Code" of "DVMA not available" (step 545). Thereafter, an announcement will be played to Subscriber A 400 stating that DVMA is not available (step 550), and the call will be torn down without being set up (step 555).

After changing the call forwarding category for the call (step 540), a call connection can then be established between Subscriber A 400 and Subscriber B 430 (step 560). At seizure, the call will encounter the CFV feature 438 (step 565) and the call will be forwarded to Subscriber B's voice mail box 450 within the voice mail system 440 (step 570) without disturbing (ringing) Subscriber B.

"Direct Voice Mail Access Blocking" (DVMAB) is a feature that provides the capability to a called subscriber to block the "Direct Voice Mail Access" of the calling subscriber. Increasingly, centralized voice mail services are being offered by local telephone companies. DVMA can be used when a calling party wishes to leave a message to the voice mail of the called subscriber without disturbing (ringing) the called subscriber. Unfortunately, with the DVMA feature, the called subscriber will not have any control over when the calling party will be able to directly access the called subscribers voice mail. Therefore, DVMAB will provide that control to the called subscriber to allow the called subscriber to block the DVMA feature. However, the actual implementation of the DVMAB feature will vary depending upon whether the calling and called subscribers are within the same switch or not.

Figure 6:
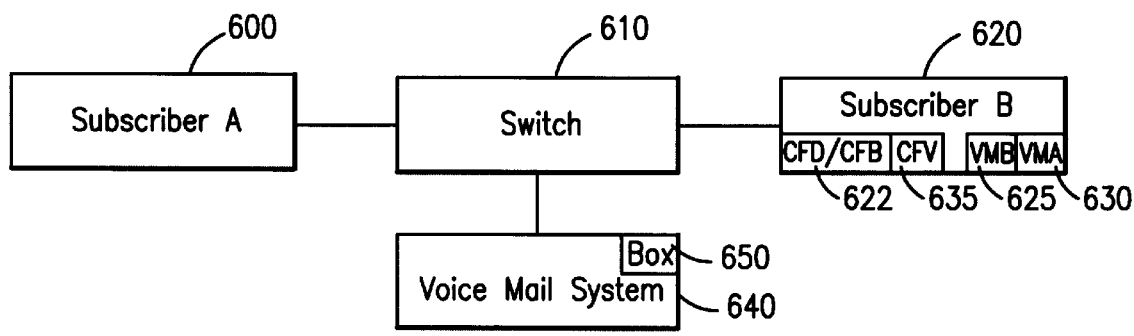
FIG. 6 is a block diagram depicting a sample embodiment of an intra-switch Direct Voice Mail Access Blocking system of the present invention.

With reference now to FIG. 6 of the drawings, in the situation where the calling subscriber (hereinafter referred to as Subscriber A 600) and the called subscriber (hereinafter referred to as Subscriber B 620) are within the same switch (Switch 610), which provides voice mail service 640 to Subscriber B 620, a new subscriber category, "Voice Mail Blocking" (VMB) 625, can be assigned to Subscriber B 620 to indicate that Subscriber B 620 is forwarded to voice mail 640 for the situations where the CFD and CFB features 622 are initiated, but direct access to voice mail 640 is blocked. Alternatively, Subscriber B 620 can activate the DVMAB feature 625 by dialing a service code, e.g., *yy for DVMAB 625. Thereafter, Switch 610 can analyze the DVMAB service code entered by Subscriber B 620 and assign the VMB category 625 to Subscriber B 620. Subsequently, if Subscriber B 620 wants to deactivate the DVMAB feature 625 (block the feature), he/she can dial a service code, e.a., *zz, to deactivate the DVMAB feature 625.

Figure 7:
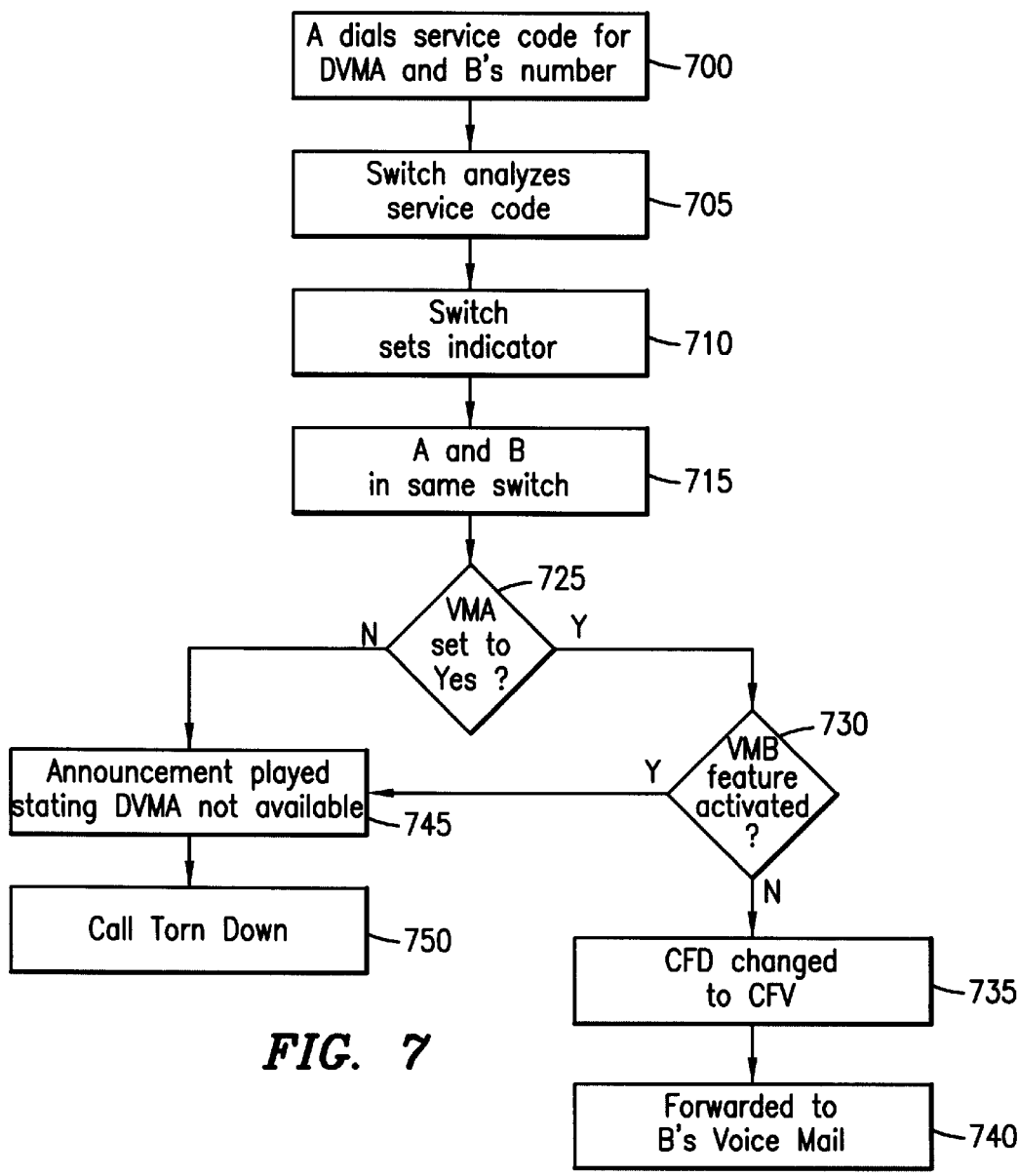
FIG. 7 illustrates steps in a sample intra-switch Direct Voice Mail Access Blocking process of the present invention.

As shown in FIG. 7 of the drawings, which will be described in connection with FIG. 6 of the drawings, steps in a sample intra-switch utilization of the DVMAB feature 625 of the present invention are illustrated in which Subscriber A 600 first dials the service code for DVMA, e.g., *xx, followed by Subscriber B's 620 number (step 700). Thereafter, Switch 610 analyzes the DVMA service code entered by Subscriber A 600 (step 705), and sets an indicator associated with the call to "DVMA requested" (step 710). Switch 610 then determines that Subscriber B 620 resides in the same switch (Switch 610) as Subscriber A 600 (step 715).

Switch 610 then ascertains whether Subscriber B 620 has purchased a voice mail feature (step 725), e.g., by checking the VMA category 630 associated with Subscriber B 620. If Subscriber B 620 has the voice mail feature (step 725), e.g., the VMA category 630 is set to "yes", and if DVMAB is not activated (VMB is not enabled) (step 730), Switch 610 changes the "Call Forwarding Don't Answer" (CFD) feature 622, which routes the call to the called subscribers voice mail system 640 when the called subscriber 620 does not answer the call, to a "Call Forwarding Variable" (CFV) feature 635 (step 735), which routes the call directly to the called subscribers voice mail 640 for this particular call (step 740).

However, if the voice mail feature 630 is either not assigned to Subscriber B 600 or is inactive (step 725), or if DVMAB is activated (VMB is enabled) (step 730), an announcement will be played to Subscriber A 600 stating that DVMA is not available (step 745), and the call will be torn down, as is understood in the art, without being set up (step 750).

Figure 8:
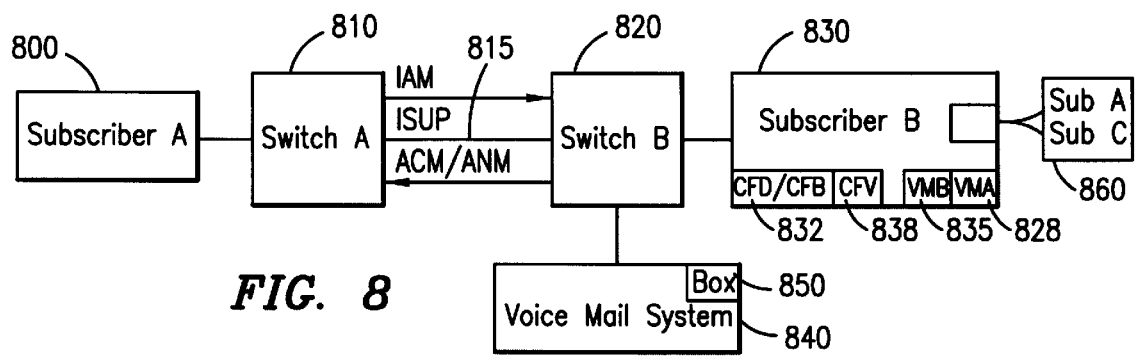
FIG. 8 is a block diagram depicting a sample embodiment of an inter-switch Direct Voice Mail Access Blocking system of the present invention.

For inter-switch DVMAB, as shown in FIG. 8 of the drawings, in which Subscriber A 800 and Subscriber B 830 are served by two separate switches (Switch A 810 and Switch B 820 respectively), Switch A 810 and Switch B 820 must be connected by SS7 signaling in order to route the appropriate messages, which carry instructions regarding the DVMA feature, between the switches.

As indicated in FIG. 8 of the drawings, Subscriber B 830 has been assigned the Call Forwarding Don't Answer (CFD) and Call Forwarding Busy (CFB) features 832, which enable calls that either are not answered by Subscriber B 830 or which encounter a "busy" signal to be routed to Subscriber B's voice mail 840. Furthermore, Subscriber B 830 has also been assigned the new category "Voice Mail Blocking" (VMB) 835 to indicate that Subscriber B 830 is connected to a voice mail service 840, but direct access to voice mail 840 is blocked. The two switches (Switch A 810 and Switch B 820) are connected by Integrated Service Digital Network (ISDN) User Part (ISUP) routes 815 and utilize ISDN User Part (ISUP) protocols to send messages between the switches (810 and 830).

Figure 9:
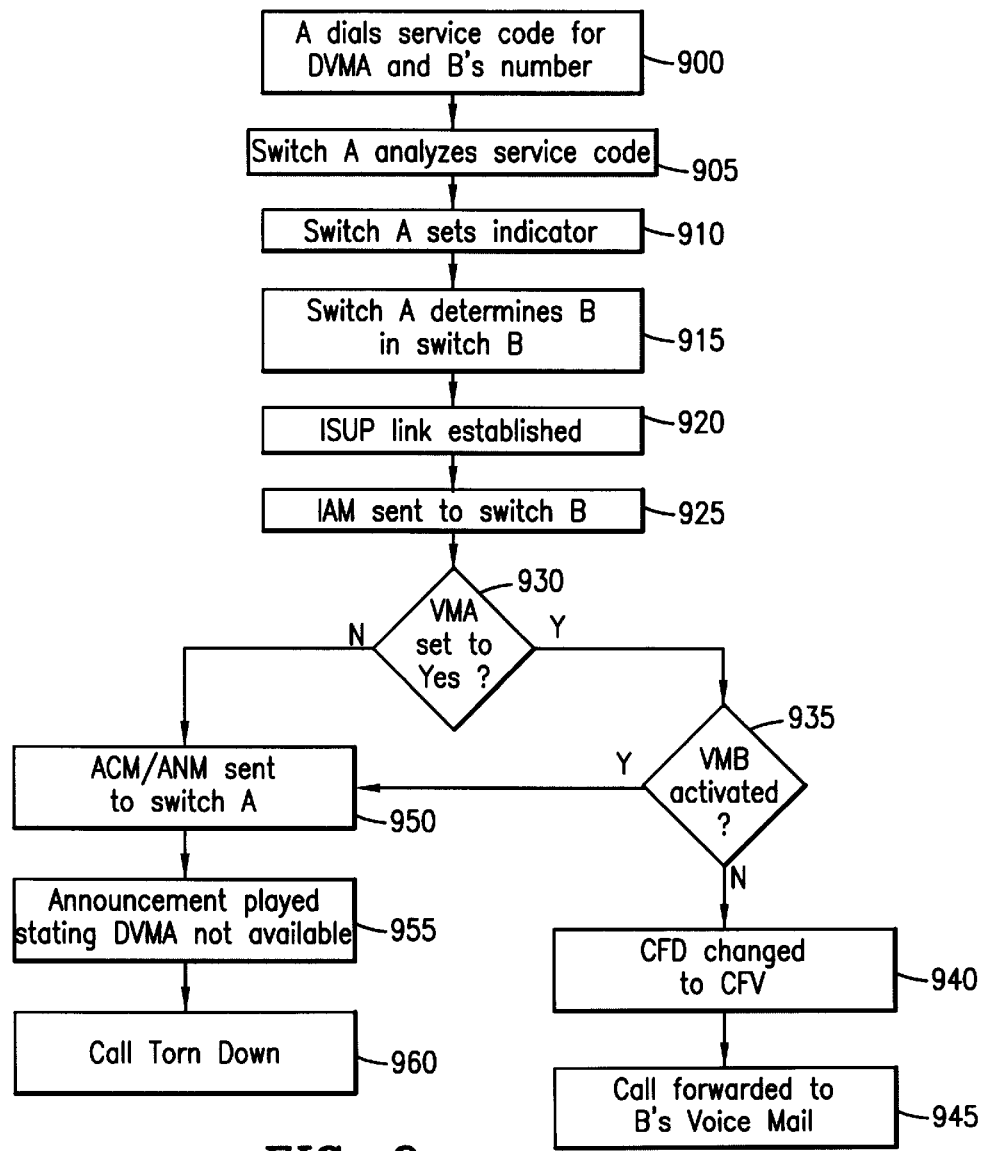
FIG. 9 illustrates steps in a sample inter-switch Direct Voice Mail Access Blocking process of the present invention.

With reference now to FIG. 9 of the drawings, which will be described in connection with FIG. 8 of the drawings, steps in a sample implementation of the inter-switch DVMAB feature 835 of the present invention are illustrated in which Subscriber A 800 first dials the service code for DVMA, e.g., *xx, followed by Subscriber B's 830 number (step 900). Thereafter, Switch A 810 analyzes the DVMA service code entered by Subscriber A 800 (step 905), and sets an indicator associated with the call to "DVMA requested" (step 910).

Switch A 810 then determines that Subscriber B 830 does not reside in Switch A 810 (step 915) and checks whether there is an ISUP link 815 between Switch A 810 and Switch B 820 (step 920). If such a link 815 is available (step 920), Switch A 810 sends a "Service Activation Parameter" with a "Feature Code" coded as a "DVMA request" in the Initial Address Message (IAM), along with other information, to Switch B 820 (step 925). Upon receiving the IAM, Switch B 820 processes the call normally, as is well known in the art, by ascertaining whether Subscriber B 830 has purchased a voice mail feature 828 (step 930), e.g., by checking the VMA category 828 associated with Subscriber B 830.

If Subscriber B 830 has the voice mail feature 828 (step 930), e.g., the VMA category 828 is set to "yes", and DVMAB is not activated (VMB is not enabled) (step 935), Switch B 820 changes the "Call Forwarding Don't Answer" (CFD) feature 832, which routes the call to the called subscribers voice mail system 840 when the called subscriber 830 does not answer the call, to a "Call Forwarding Variable" (CFV) feature 838 (step 940), which can then route the call directly to the called subscribers voice mail box 850 within the voice mail system 840 for this particular call (step 945).

However, if the voice mail feature 838 is either not assigned to Subscriber B 830 or is inactive (step 930), of if DVMAB is activated (VMB is enabled) (step 935), Switch B 820 will respond to Switch A 810 with a "Service Activation" parameter in an Address Complete Message (ACM) or Answer Message (ANM) with a "Feature Code" of "DVMA not available" (step 950). Thereafter, an announcement will be played to Subscriber A 800 stating that DVMA is not available (step 955), and the call will be torn down, as is understood in the art, without being set up (step 960).

In an alternative embodiment of the present invention, also shown in FIG. 8 of the drawings, an extended version of DVMAB, selective DVMAB, can be used by Subscriber B 830 to indicate the specific calling subscribers either allowed or not allowed to directly access Subscriber B's voice mail system 840. Subscriber B 830 can create a list 860 of directory numbers, using subscriber procedures, e.g., dialing a service code, followed by a directory number to add a number to the list or delete a number from the list 860. With selective DVMAB, when Subscriber A 800 initiates a call to Subscriber B's voice mail system 840 directly, prior to connecting Subscriber A 800 to Subscriber B's voice mail box 850, Switch B 830 checks Subscriber A's 800 number against the list 860 of allowed or disallowed numbers. If Subscriber A's 800 number is not available, or if Subscriber A 800 is restricted from directly accessing Subscriber B's voice mail 850, according to the list 860, rejection treatment is applied to Subscriber A 800.

Advantageously, the DVMA and DVMAB features are particularly useful in business environments where the calling party has the ability to leave a message without disturbing the called party and the called party can control when to block this direct access to voice mail. These features are also useful in residential environments where the calling party needs to leave a message for the called subscriber late at night.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for enabling a calling subscriber to place a call directly to a voice mail box associated with a called subscriber without ringing said called subscriber, said telecommunications system comprising:

a switch connected to said calling subscriber for connecting said call from said calling subscriber to said called subscriber, said switch being configured to receive from said calling subscriber simultaneously a dialed service code for activating a Direct Voice Mail Access feature subscribed to by said calling subscriber and implemented within said switch along with a dialed number associated with said called subscriber, activation of said Direct Voice Mail Access feature allowing said switch to route said call directly to said voice mail box of said called subscriber without ringing said called subscriber; and a voice mail system in communication with said switch, said voice mail box associated with said called subscriber being located within said voice mail system, said switch connecting said call directly to said voice mail box in response to receipt of said service code.

2. The telecommunications system of claim 1, wherein said switch is a service switching point.

3. The telecommunications system of claim 1, wherein said called subscriber has a Call Forwarding Don't Answer feature associated therewith.

4. The telecommunications system of claim 3, wherein said calling subscriber and said called subscriber are served by said switch.

5. The telecommunications system of claim 4, wherein said Call Forwarding Don't Answer feature associated with said called subscriber is changed to a Call Forwarding Variable feature when said calling subscriber dials said service code associated with said Direct Voice Mail Access feature, said call being connected by said switch directly to said voice mail box associated with said called subscriber, without ringing said called subscriber.

6. The telecommunications system of claim 3, wherein said calling subscriber is served by said switch and said called subscriber is served by an additional switch.

7. The telecommunications system of claim 6, wherein said additional switch associated with said called subscriber and said switch associated with said calling subscriber are connected by Integrated Service Digital Network User Part trunks and utilize SS7 signaling to send messages therebetween.

8. The telecommunications system of claim 6, wherein said Call Forwarding Don't Answer feature associated with said called subscriber is changed to a Call Forwarding Variable featured when said calling subscriber dials said service code associated with said Direct Voice Mail Access feature, said call being connected by said additional switch associated with said called subscriber, directly to said voice mail box associated with said called subscriber, without ringing said called subscriber.

9. The telecommunications system of claim 8, wherein said call is connected to said voice mail box associated with said called subscriber by said switch associated with said calling subscriber sending a Feature Code coded as a Direct Mail Voice Access request in a Service Activation parameter within an Initial Address Message to said additional switch associated with said called subscriber.

10. The telecommunications system of claim 6, wherein said call is not routed to said voice mail box associated with said called subscriber when a voice mail feature associated with said called subscriber is not activated.

11. The telecommunications system of claim 10, wherein said additional switch associated with said called subscriber sends to said switch associated with said calling subscriber a Feature Code coded as Direct Voice Mail Access unavailable in a Service Activation parameter in a message when said voice mail feature associated with said called subscriber is not activated.

12. The telecommunications system of claim 11, wherein said message is an Address Complete Message.

13. The telecommunications system of claim 11, wherein said message is an Answer Message.

14. The telecommunications system of claim 11, wherein an announcement indicating said Direct Voice Mail Access feature is not available is played to said calling subscriber when said voice mail feature associated with said called subscriber is not activated.

15. The telecommunications system of claim 1, wherein said called subscriber has a Direct Voice Mail Access Blocking feature associated therewith.

16. The telecommunications system of claim 15, wherein said called subscriber activates said Direct Voice Mail Access Blocking feature by entering a service code associated with said Direct Voice Mail Access Blocking feature.

17. The telecommunications system of claim 15, wherein said switch does not connect said call from said calling subscriber to said voice mail box associated with said called subscriber when said Direct Voice Mail Access Blocking feature is activated.

18. The telecommunications system of claim 17, wherein an announcement indicating said Direct Voice Mail Access feature is not available is played to said calling subscriber when said Direct Voice Mail Access Blocking feature associated with said called subscriber is activated.

19. A method for placing a call from a calling subscriber directly to a voice mail box associated with a called subscriber without ringing said called subscriber, said method comprising the steps of:

simultaneously dialing, by said calling subscriber, a service code associated with a Direct Voice Mail Access feature subscribed to by said calling subscriber and implemented within a switch connected to said calling subscriber and a number associated with said called subscriber;

receiving, by said switch, said service code and said number; and connecting said call from said calling subscriber directly from said switch to said voice mail box associated with said called subscriber, in response to receipt of said service code.

20. The method of claim 19, wherein said switch is a service switching point.

21. The method of claim 19, wherein said called subscriber has a Call Forwarding Don't Answer feature associated therewith.

22. The method of claim 21, wherein said calling subscriber and said called subscriber are served by said switch.

23. The method of claim 22, further comprising, after said step of entering said service code and said number, the step of:

changing said Call Forwarding Don't Answer feature associated with said called subscriber to a Call Forwarding Variable feature to connect said call, by said switch, directly to said voice mail box associated with said called subscriber, without ringing said called subscriber.

24. The method of claim 21, wherein said calling subscriber is served by said switch and said called subscriber is served by an additional switch.

25. The method of claim 24, wherein said additional switch associated with said called subscriber and said switch associated with said calling subscriber are connected by Integrated Service Digital Network User Part trunks and utilize SS7 signaling to send messages therebetween.

26. The method of claim 24, further comprising, after said step of entering said service code and said number, the step of:

changing said Call Forwarding Don't Answer feature associated with said called subscriber to a Call Forwarding Variable feature to connect said call, by said additional switch associated with said called subscriber, directly to said voice mail box associated with said called subscriber, without ringing said called subscriber.

27. The method of claim 26, wherein said step of connecting said call to said voice mail box associated with said called subscriber is performed by said switch associated with said calling subscriber sending a Feature Code coded as a Direct Mail Voice Access request in a Service Activation parameter within an Initial Address Message to said additional switch associated with said called subscriber.

28. The method of claim 24, further comprising, before said step of connecting, the step of:

determining, by said additional switch associated with said called subscriber, if a voice mail feature associated with said called subscriber is activated, said call not being routed to said voice mail box associated with said called subscriber when said voice mail feature associated with said called subscriber is not activated.

29. The method of claim 28, further comprising, after said step of determining, the step of:

sending, by said additional switch associated with said called subscriber, to said switch associated with said calling subscriber a Feature Code coded as Direct Voice Mail Access unavailable in a Service Activation parameter in a message when said voice mail feature associated with said called subscriber is not activated.

30. The method of claim 29, wherein said message is an Address Complete Message.

31. The method of claim 29, wherein said message is an Answer Message.

32. The method of claim 29, further comprising, after said step of sending, the step of:

playing, by said switch associated with said calling subscriber, an announcement indicating said Direct Voice Mail Access feature is not available to said calling subscriber when said voice mail feature associated with said called subscriber is not activated.

33. The method of claim 19, wherein said called subscriber has a Direct Voice Mail Access Blocking feature associated therewith.

34. The method of claim 33, further comprising, before said step of entering said service code associated with said Direct Voice Mail Access feature, the step of:

activating said Direct Voice Mail Access Blocking feature by said calling subscriber entering a service code associated with said Direct Voice Mail Access Blocking feature.

35. The method of claim 33, further comprising, before said step of connecting, the step of:

determining, by said switch, if said Direct Voice Mail Access Blocking feature associated with said called subscriber is activated, said call from said calling subscriber not being connected, by said switch, to said voice mail box associated with said called subscriber when said Direct Voice Mail Access Blocking feature is activated.

36. The method of claim 35, further comprising, after said step of determining, the step of:

playing an announcement indicating said Direct Voice Mail Access feature is not available to said calling subscriber when said Direct Voice Mail Access Blocking feature associated with said called subscriber is activated.

* * * * *